United States Patent
Agiwal et al.

(10) Patent No.: US 12,225,542 B2
(45) Date of Patent: *Feb. 11, 2025

(54) METHOD AND APPARATUS FOR PERFORMING COMMUNICATION IN WIRELESS COMMUNICATION SYSTEM

(71) Applicant: Samsung Electronics Co., Ltd., Suwon-si (KR)

(72) Inventors: Anil Agiwal, Suwon-si (KR); Jaehyuk Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 244 days.

This patent is subject to a terminal disclaimer.

(21) Appl. No.: 17/804,498

(22) Filed: May 27, 2022

(65) Prior Publication Data

US 2022/0295541 A1  Sep. 15, 2022

Related U.S. Application Data

(63) Continuation of application No. 16/817,431, filed on Mar. 12, 2020, now Pat. No. 11,350,443.

(60) Provisional application No. 62/817,505, filed on Mar. 12, 2019.

(51) Int. Cl.
*H04W 72/23* (2023.01)
*H04L 1/1812* (2023.01)
*H04W 72/1268* (2023.01)

(52) U.S. Cl.
CPC .......... *H04W 72/23* (2023.01); *H04L 1/1812* (2013.01); *H04W 72/1268* (2013.01)

(58) Field of Classification Search
CPC . H04W 72/23; H04W 72/1268; H04W 36/00; H04L 1/1812; H04L 1/1864; H04L 1/1887; H04L 1/1822
See application file for complete search history.

(56) References Cited

U.S. PATENT DOCUMENTS

| | | | |
|---|---|---|---|
| 9,439,191 B2 * | 9/2016 | Kim | H04W 72/0446 |
| 2015/0282213 A1 | 10/2015 | Sun et al. | |
| 2017/0202043 A1 | 7/2017 | Seo | |

(Continued)

FOREIGN PATENT DOCUMENTS

| | | |
|---|---|---|
| CN | 104737614 A | 6/2015 |
| CN | 106688297 A | 5/2017 |

(Continued)

OTHER PUBLICATIONS

The First Office Action dated Mar. 12, 2024, in connection with Chinese Application No. 202080020001.6, 11 pages.

(Continued)

*Primary Examiner* — Cheikh T Ndiaye

(57) ABSTRACT

A method, performed by a user equipment (UE), of performing communication in a handover process includes receiving uplink (UL) grant configuration information via an RRC reconfiguration message, selecting a SSB among a plurality of SSBs included in the UL grant information, determining a UL grant corresponding to the selected SSB and a HARQ process corresponding to the UL grant based on the UL grant information and transmitting a reconfiguration complete message in the determined UL grant corresponding to the selected SSB using a HARQ process.

16 Claims, 13 Drawing Sheets

(56) References Cited

U.S. PATENT DOCUMENTS

2017/0367069 A1    12/2017  Agiwal et al.
2018/0338271 A1*   11/2018  Park .................... H04B 7/0695
2019/0297547 A1*    9/2019  Tsai ............... H04W 36/00725
2020/0337002 A1*   10/2020  Ko ....................... H04L 5/0016

FOREIGN PATENT DOCUMENTS

CN       109076493 A     12/2018
WO       2018203308 A1   11/2018

OTHER PUBLICATIONS

AsusteK, "Discussion on RACH-less handover mechanism for NR", 3GPP TSG-RAN WG2 Meeting #105, Feb. 25-Mar. 1, 2019, R2-1901041, 4 pages.

Samsung (Rapporteur), "Miscellaneous corrections", Change Request, 3GPP TSG-RAN WG2 Meeting #105, Feb. 25-Mar. 1, 2019, R2-1902350, 37 pages.

Huawei, HiSilicon, "Discussion on RACH-less solution", 3GPP TSG-RAN WG2#105, Feb. 25-Mar. 1, 2019, R2-1900704, 4 pages.

Vivo, "RACH-less with SSB association", 3GPP TSG-RAN WG2 Meeting #105, Feb. 25-Mar. 1, 2019, R2-1900502, 2 pages.

Notification of Transmittal of the International Search Report and the Written Opinion of the International Searching Authority, or the Declaration dated Jun. 25, 2020 in connection with International Patent Application No. PCT/KR2020/003441, 10 pages.

Supplementary European Search Report dated Mar. 28, 2022, in connection with European Application No. 20769603.0, 8 pages.

Notification of the Decision to Grant a Patent Right for Patent Invention dated Dec. 17, 2024, in connection with Chinese Application No. 202080020001.6, 7 pages.

* cited by examiner

METHOD AND APPARATUS FOR PERFORMING COMMUNICATION IN WIRELESS COMMUNICATION SYSTEM

CROSS-REFERENCE TO RELATED APPLICATIONS

This application is a continuation of application Ser. No. 16/817,431, filed Mar. 12, 2020, now U.S. Pat. No. 11,350,443, which is based on and claims priority under 35 U.S.C. § 119(e) of a U.S. Provisional application No. 62/817,505, filed on Mar. 12, 2019, in the United States Patent and Trademark Office, the disclosures of which are incorporated by reference herein in their entirety.

BACKGROUND

1. Field

The disclosure relates to wireless communication systems, and more particularly, to methods and apparatuses for determining synchronization signal blocks (SSBs) and hybrid automatic repeat request (HARM) process corresponding to configured uplink (UL) grants for random access channel (RACH)-less handover.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

In the current handover procedure, an initial beam alignment between UE and target cell occurs via random access procedure. In order to reduce handover latency, RACH-less handover needs to be studied.

Provided are methods and apparatuses for performing communication in a handover procedure. A method, performed by a UE, of performing the communication in the handover procedure, according to an embodiment, includes receiving uplink (UL) grant configuration information via RRC reconfiguration message; selecting a SSB among a plurality of SSBs included in the UL grant information; determining a UL grant corresponding to the selected SSB and a HARQ process corresponding to the UL grant based on the UL grant information; and transmitting reconfiguration complete message in the determined UL grant corresponding to the selected SSB using a HARQ process.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

DETAILED DESCRIPTION

Figure 1:
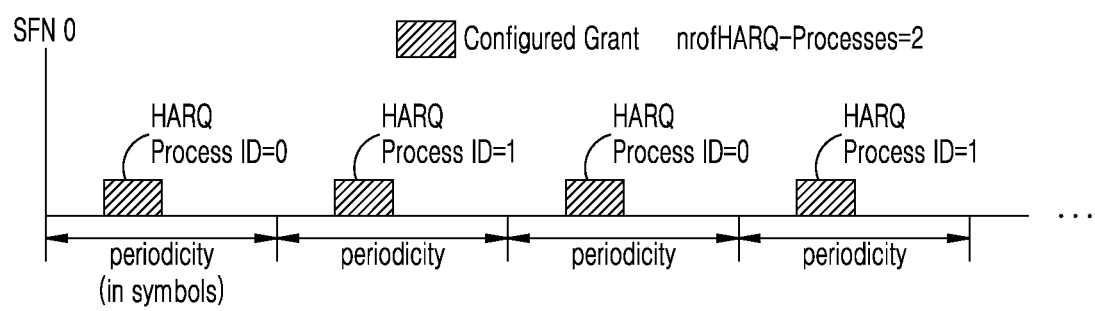
FIG. 1 is an example illustration of mapping between HARQ Process ID and configured UL grant based on the above method.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The present application provides a method and an apparatus for performing a communication in the handover procedure.

To achieve the objective above, the present application adopts the following technical solutions: a method of performing a communication, by a UE, including: receiving uplink (UL) grant configuration information via RRC reconfiguration message; selecting a SSB among a plurality of SSBs included in the UL grant information; determining a UL grant corresponding to the selected SSB and a HARQ process corresponding to the UL grant based on the UL grant information; and transmitting reconfiguration complete message in the determined UL grant corresponding to the selected SSB using a HARQ process.

In some embodiments, the determining the UL grant and the HARQ process comprises identifying a periodicity at which UL grants are configured and a number of SSBs associated with the UL grants based on the UL grant information; and determining the UL grant and the HARQ process based on a current symbol using the identified periodicity and the identified number.

In some embodiments, the determining the UL grant and the HARQ process comprises identifying a periodicity at which UL grants are configured and a number of SSBs associated with the UL grants based on the UL grant information; and determining the UL grant based on a current symbol using the identified periodicity and the identified number and the HARQ process based on the current symbol using the identified periodicity.

In some embodiments, the selecting SSB comprises: obtaining a list indicating SSBs for a plurality of UL grant configurations from the UL grant configuration information; and wherein selecting SSB comprises selecting a SSB for each of the plurality of UL grant configurations and the UL grant corresponding to the selected SSB and the HARQ process corresponding to the UL grant is determined based on each of the plurality of UL grant configurations.

In some embodiments, the determining the HARQ process comprises: identifying offset value for each of the plurality of the UL grant configurations; and determining the HARQ process corresponding to the UL grant based on the identified offset.

A method of performing communication on an unlicensed band, by a base station, comprising: transmitting uplink (UL) grant configuration information via an RRC reconfiguration message; and receiving, from a user equipment (UE) a reconfiguration complete message in a UL grant corresponding to a SSB selected at the UE using a HARQ process, wherein the SSB is selected among a plurality of SSBs included in the UL grant information, and the UL grant corresponding to the selected SSB and the HARQ process corresponding to the UL grant is determined based on the UL grant information.

A user equipment (UE) of performing communication in wireless communication system, the UE, comprising: a transceiver; and a processor coupled with the transceiver and configured to: control the transceiver to receive uplink (UL) grant configuration information via an RRC reconfiguration message, select a SSB among a plurality of SSBs included in the UL grant information, determine a UL grant corresponding to the selected SSB and a HARQ process corresponding to the UL grant based on the UL grant information and control the transceiver to transmit a reconfiguration complete message in the determined UL grant corresponding to the selected SSB using a HARQ process.

A base station of performing communication in wireless communication system, the base station, comprising: a transceiver; and a processor coupled with the transceiver and configured to: control the transceiver to transmit uplink (UL) grant configuration information via RRC reconfiguration message; and control the transceiver to receive, from a user equipment (UE), reconfiguration complete message in a UL grant corresponding to a SSB selected at the UE using a HARQ process, wherein the SSB is selected among a plurality of SSBs included in the UL grant information, and the UL grant corresponding to the selected SSB and the HARQ process corresponding to the UL grant is determined based on the UL grant information.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s).

The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The fifth generation wireless communication system supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilize radio resources provided by two distinct schedulers, located in two different nodes connected via a non-ideal backhaul and providing either E-UTRA (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, SCell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:
  the MIB is always transmitted on the PBCH with a periodicity of 80 ms and repetitions made within 80 ms and it includes parameters that are needed to acquire SIB1 from the cell.
  the SIB1 is transmitted on the DL-SCH with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;
  SIBs other than SIB1 are carried in SystemInformation (SI) messages, which are transmitted on the DL-SCH. Only SIBs having the same periodicity can be mapped to the same SI message.

In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations are signaled by GNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \mod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of coreset configuration associated with it. A list of coreset configurations are signaled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each coreset configuration is associated with a list of TCI (Transmission configuration indicator) states. One DL RS ID (SSB or CSI RS) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by GNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In fifth generation wireless communication system (also referred as new radio i.e. NR), network controlled cell level mobility is supported for UEs in radio resource control (RRC) CONNECTED. A typical procedure for cell level mobility as described in TS 38.300 is as follows:

1. The source gNB configures the UE measurement procedures and the UE reports according to the measurement configuration.
2. The source gNB decides to handover the UE, based on MeasurementReport and RRM information.
3. The source gNB issues a Handover Request message to the target gNB passing a transparent RRC container with information to prepare the handover at the target side. The information includes at least the target cell ID, KgNB*, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different RATs, PDU session related information, and can include the UE reported measurement information including beam-related information if available. The PDU session related information includes the slice information (if supported) and QoS flow level QoS profile(s).
4. Admission Control may be performed by the target gNB. Slice-aware admission control shall be performed if the slice information is sent to the target gNB. If the PDU sessions are associated with non-supported slices the target gNB shall reject such PDU Sessions.
5. The target gNB prepares the handover with L1/L2 and sends the HANDOVER REQUEST ACKNOWLEDGE to the source gNB, which includes a transparent container to be sent to the UE as an RRC message to perform the handover.
6. The source gNB triggers the Uu handover by sending an RRCReconfiguration message to the UE, containing the information used to access the target cell: at least the target cell ID, the new C-RNTI, the target gNB security algorithm identifiers for the selected security algorithms. It can also include a set of dedicated RACH resources, the association between RACH resources and SSB(s), the association between RACH resources and UE-specific CSI-RS configuration(s), common RACH resources, and system information of the target cell, etc.

7. The source gNB sends the SN STATUS TRANSFER message to the target gNB.
8. The UE synchronizes to the target cell After the DL synchronization, UE performs random access procedure for UL synchronization. UE completes the RRC handover procedure by sending RRCReconfiguration-Complete message to target gNB.
9. The target gNB sends a PATH SWITCH REQUEST message to AMF to trigger 5GC to switch the DL data path towards the target gNB and to establish an NG-C interface instance towards the target gNB.
10. 5GC switches the DL data path towards the target gNB. The UPF sends one or more "end marker" packets on the old path to the source gNB per PDU session/tunnel and then can release any U-plane/TNL resources towards the source gNB.
11. The AMF confirms the PATH SWITCH REQUEST message with the PATH SWITCH REQUEST ACKNOWLEDGE message.
12. Upon reception of the PATH SWITCH REQUEST ACKNOWLEDGE message from the AMF, the target gNB sends the UE CONTEXT RELEASE to inform the source gNB about the success of the handover. The source gNB may then release radio and C-plane related resources associated to the UE context. Any ongoing data forwarding may continue.

In order to reduce handover latency, RACH-less handover is being studied. In case of RACH-less handover, UE may not perform random access with the target cell. A handover command (i.e. RRCReconfiguration wherein CellGroup-Config IE in RRCReconfiguration message contains the spCellConfig with reconfigurationWithSync) may indicate whether the UE should skip random access with target cell or not. For UL transmission in the target cell, the handover command also indicates whether to apply timing advance (TA) of source cell or that the TA equals zero. Handover command may optionally provide pre-allocated UL grants for transmitting the RRCReconfigurationComplete message and/or UL data. NR supports high frequency bands (between 24250 MHz and 52600 MHz), also referred as FR2 frequency bands and lower frequency bands (between 410 MHz and 7125 MHz) also referred as FR1 frequency bands. At high frequency, beamforming may be essential. In the current handover procedure, initial beam alignment between UE and target cell occurs via random access procedure. In case of RACH-less handover, for beam alignment, pre-allocated UL grants signaled in handover command (i.e. RRCReconfiguration wherein CellGroupConfig IE in RRCReconfiguration message contains the spCellConfig with reconfigurationWithSync) may be associated with one or more synchronization signal blocks i.e. SSB(s)/channel state information reference signals i.e. CSI RS(s) transmitted by gNB. Each SSB/CSI-RS is identified by an SSB ID/CSI-RS ID respectively. UE can select a suitable SSB/CSI RS (where an SSB/CSI RS is suitable if SS-RSRP/CSI-RSRP measured by UE for an SSB/CSI-RS is above a configured threshold) and then transmit MAC PDU in UL grant corresponding to selected SSB/CSI RS. A method determines that which UL grant among the pre-allocated UL grants is associated with which SSB/CSI RS and what is the HARQ Process ID corresponding to each UL grant among the pre-allocated UL grants.

In NR, network may signal configured UL grants by transmitting RRCReconfiguration message including ConfiguredGrantConfig IE. UE may determine the HARQ Process ID corresponding to a configured UL grant which starts at 'CURRENT_symbol' as follows:

HARQ Process ID=[floor(CURRENT_symbol/periodicity)] modulo nrofHARQ-Processes
where CURRENT_symbol=(SFN×numberOfSlotsPerFrame×numberOfSymbolsPerSlot+slot number in the frame×numberOfSymbolsPerSlot+symbol number in the slot)
numberOfSlotsPerFrame and numberOfSymbolsPerSlot refer to the number of consecutive slots per frame and the number of consecutive symbols per slot respectively. numberOfSlotsPerFrame is specific to SCS and is pre-defined for each SCS.
periodicity (in symbols) is the periodicity at which UL grants are configured via ConfiguredGrantConfig. ConfiguredGrantConfig is signaled in RRCReconfiguration message
SFN is the system frame number in which this configured UL grant is allocated
slot number is the starting slot of this configured UL grant
symbol number is the starting symbol of this configured UL grant
nrofHARQ-Processes is signaled in ConfiguredGrantConfig
In case of bundled UL grant, CURRENT_symbol refers to the symbol index of the first transmission occasion of a repetition bundle that takes place FIG. 1 is an example illustration of mapping between HARQ Process ID and configured UL grant based on the above method. In the example, nrofHARQ-Processes is 2. The HARQ Process ID is sequentially assigned to UL grants every 'N' periods wherein the first period starts at SFN 0 and N is equal to nrofHARQ-Processes.

According to an embodiment of the disclosure, provided is a method of mapping between configured UL grant, SSB/CSI-RS and HARQ Process ID in case of-RACH less reconfiguration with synchronization in handover/reconfigurationWithSync/reconfiguration procedure.

Hereinafter, embodiments of the disclosure will be described in detail with reference to accompanying drawings. These methods can also be applied for cases other than handover/reconfigurationWithSync/reconfiguration procedure.

Figure 2:
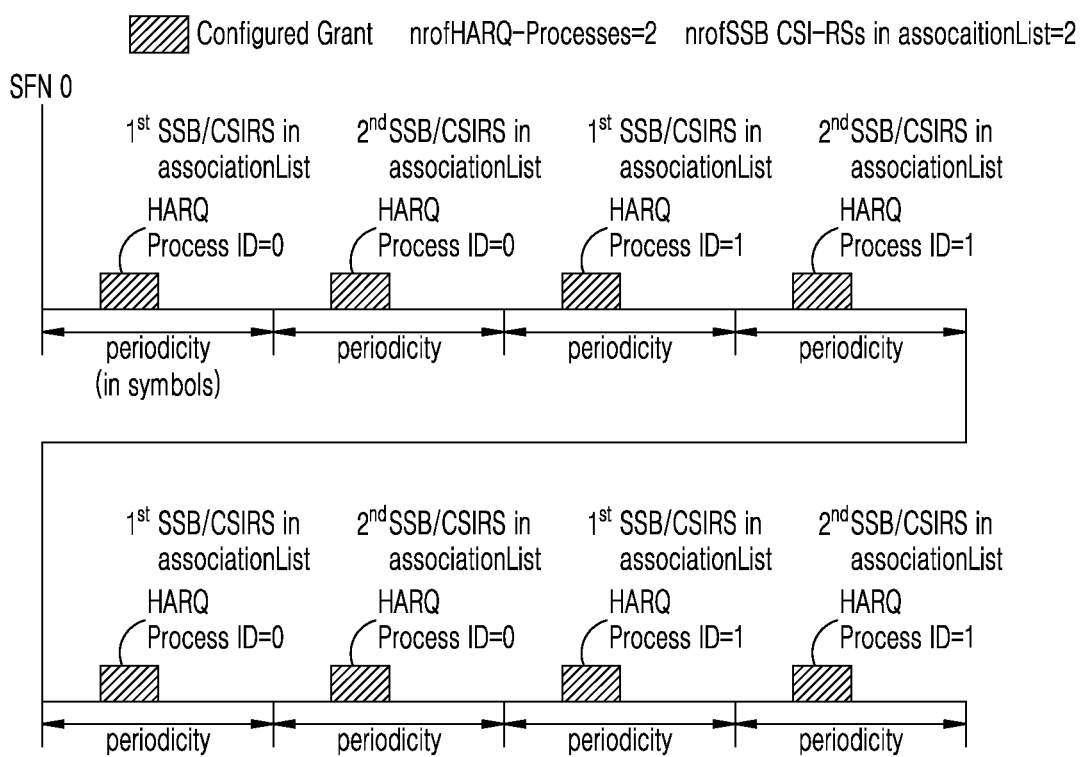
FIG. 2 is a diagram illustrating a method of mapping SSB/CSI-RSs, HARQ Process IDs and configured UL grants, according to an embodiment of the disclosure.

FIG. 2 is a diagram illustrating a method of mapping SSBs/CSI-RSs, HARQ Process IDs and configured UL grants, according to an embodiment of the disclosure.

Referring to the FIG. 2, network (i.e. gNB) may signal (e.g. in reconfiguration message or system information or connection release message) a configured grant configuration and a list of SSB/CSI RSs (SSB ID or CSI RS ID or TCI state ID is included in list) associated with this configured grant configuration. In this method, SSBs/CSI RSs in the list of SSB/CSI RSs associated with this configured grant configuration are sequentially associated to UL grants every 'N' periods wherein the first period starts at SFN 0 and N is equal to number of SSB/CSI RSs in the list. In the example, nrofHARQ-Processes is 2 and number of SSB/CSI-RSs associated with configured grants is 2.

Figure 3:
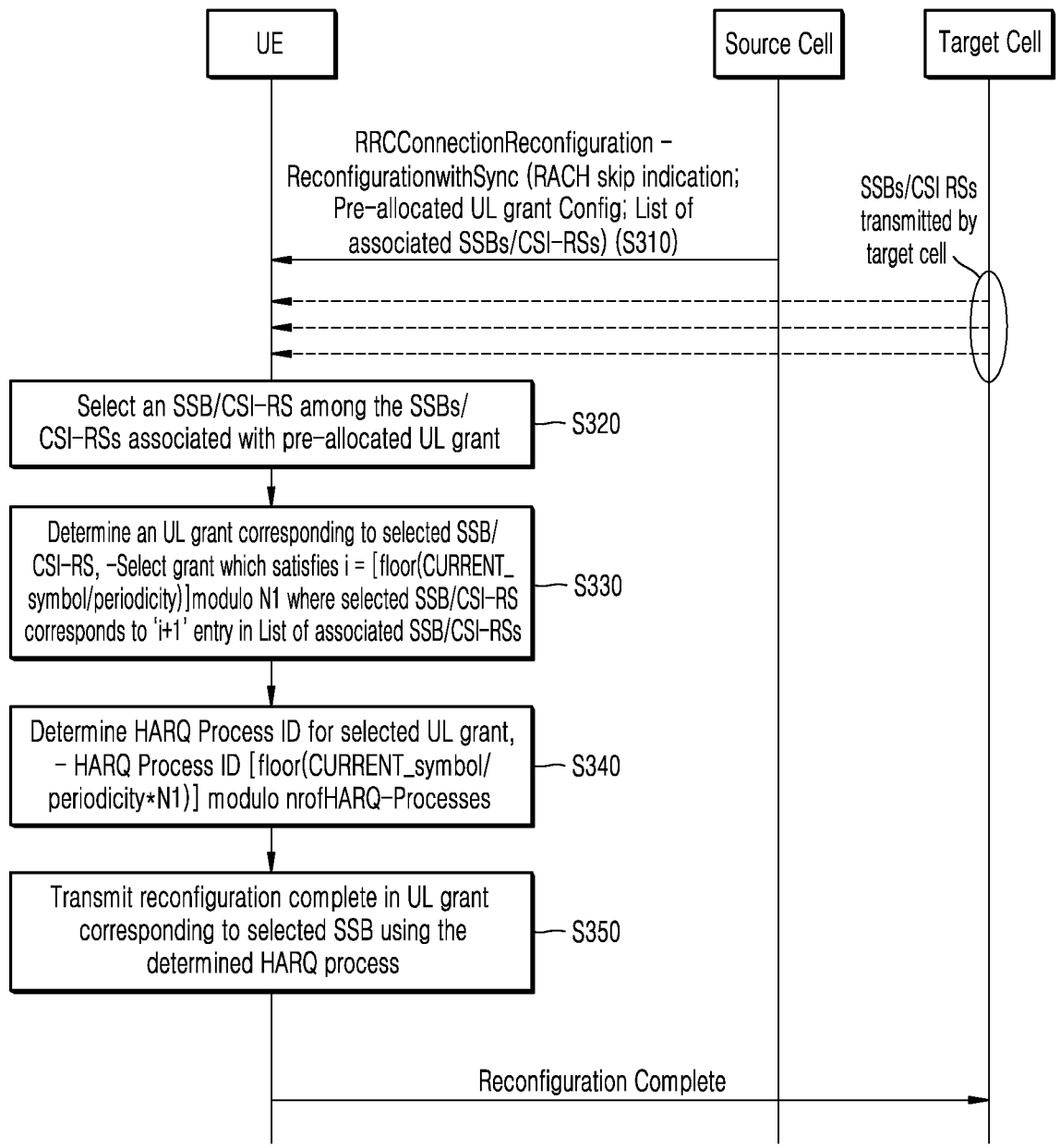
FIG. 3 is a flowchart illustrating a method of mapping SSB/CSI-RSs, HARQ Process IDs and configured UL grants, according to an embodiment of the disclosure.

FIG. 3 is a flowchart illustrating a method of mapping SSBs/CSI-RSs, HARQ Process IDs and configured UL grants, according to an embodiment of the disclosure.

In operation S310, a UE may receive a RRCReconfiguration message from a gNB. spCellConfig in RRCReconfiguration message may include reconfigurationWithSync. Information (e.g. indication to skip RACH) included in reconfigurationWithSync IE indicates that the UE shall skip RACH towards the target cell. The RRCReconfiguration message may include pre-allocated UL grant configuration (parameters indicating periodically occurring UL grants). This configuration may be provided for at least UL BWP indicated by firstActiveUplinkBWP-Id. The RRCReconfiguration message also may include a list (associationList) of SSB/CSI-RS(s) associated with the pre-allocated or configured UL grants. In an alternate embodiment, the above information for pre-allocated/configured UL grant configurations transmitted in RRCReconfiguration message can be transmitted by gNB in connection release message or in system information message for using the configured UL grants in idle/inactive state. pre-allocated/configured UL grant configurations in idle/inactive state are for initial active UL BWP or UL BWP may also be indicated. In operation S320, the UE may select an SSB/CSI-RS among the SSB(s)/CSI RS(s) associated with pre-allocated or configured UL grant(s). Before the selection of the SSB/CSI-RS, SSBs/CSI RSs transmitted by cell (e.g. target cell in case of handover) may be received at the UE.

In operation S330, the UE may determine a configured UL grant corresponding to the selected SSB/CSI-RS. A configured UL grant may be associated with SSB/CSI-RS in 'index+1' row in the list of associated SSB/CSI RSs. if index=[floor(CURRENT_symbol/periodicity)] modulo N1,
where CURRENT_symbol=(SFN×numberOfSlotsPerFrame×numberOfSymbolsPerSlot+slot number in the frame×numberOfSymbolsPerSlot+symbol number in the slot)
numberOfSlotsPerFrame and numberOfSymbolsPerSlot refer to the number of consecutive slots per frame and the number of consecutive symbols per slot respectively. numberOfSlotsPerFrame is specific to SCS and is pre-defined for each SCS.
periodicity (in symbols) is the periodicity at which UL grants are configured and is signaled in RRCReconfiguration message or system information or connection release message
SFN is the system frame number in which configured UL grant is allocated
slot number is the starting slot of configured UL grant
symbol number is the starting symbol of configured UL grant
nrofHARQ-Processes is signaled in RRCReconfiguration message or system information or connection release message.
N1=Number of SSBs/CSI-RSs associated with configured UL Grants In operation S340, the UE may determine the HARQ Process ID for selected configured UL grant as follows:
HARQ Process ID=[floor(CURRENT_symbol/(periodicity*N1))] modulo nrofHARQ-Processes
where CURRENT_symbol=(SFN×numberOfSlotsPerFrame×numberOfSymbolsPerSlot+slot number in the frame×numberOfSymbolsPerSlot+symbol number in the slot)
numberOfSlotsPerFrame and numberOfSymbolsPerSlot refer to the number of consecutive slots per frame and the number of consecutive symbols per slot respectively. numberOfSlotsPerFrame is specific to SCS and is pre-defined for each SCS.
periodicity (in symbols) is the periodicity at which UL grants are configured and is signaled in RRCReconfiguration message or system information or connection release message
SFN is the system frame number in which configured UL grant is allocated
slot number is the starting slot of configured UL grant
symbol number is the starting symbol of configured UL grant
nrofHARQ-Processes is signaled in RRCReconfiguration message or system information or connection release message
N1=Number of SSBs/CSI-RSs associated with configured UL Grants In operation S350, the UE may transmit reconfiguration complete message or UL MAC PDU in the determined UL grant corresponding to selected SSB/CSI RS using the determined HARQ process.

Figure 4:
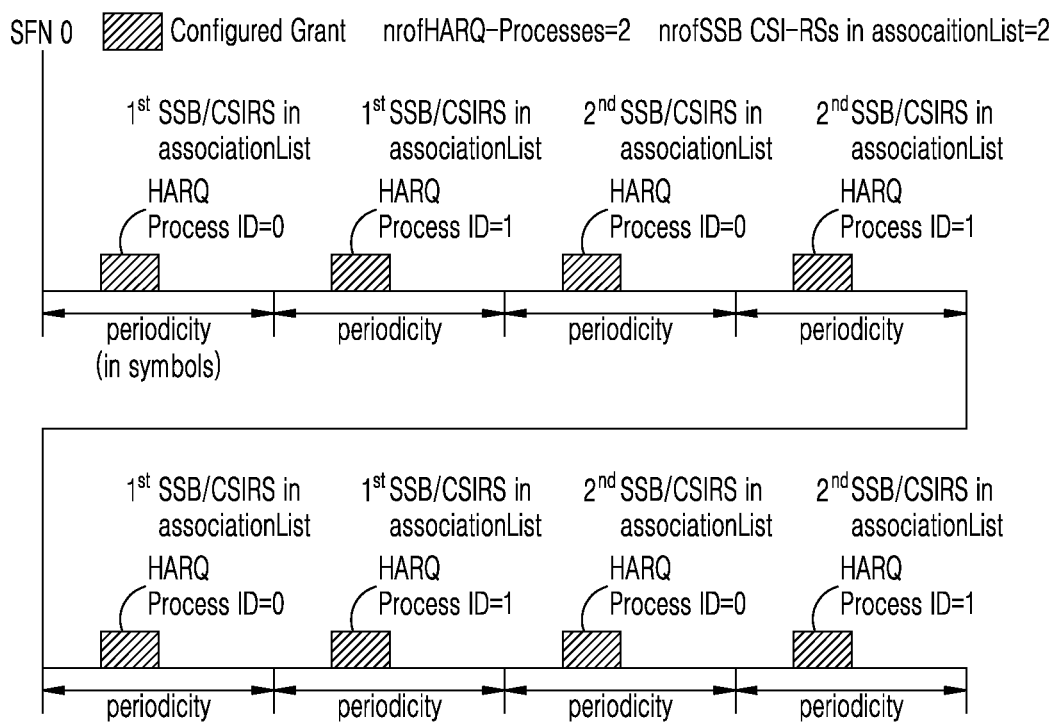
FIG. 4 is a diagram illustrating a method of mapping SSB/CSI-RSs, HARQ Process IDs and configured UL grants, according to an embodiment of the disclosure.

FIG. 4 is a diagram illustrating a method of mapping SSBs/CSI-RSs, HARQ Process IDs and configured UL grants, according to an embodiment of the disclosure.

Referring to the FIG. 4, network may signal (e.g. in reconfiguration message or system information message or connection release message) a configured grant configuration and a list of SSB/CSI RSs (SSB ID or CSI RS ID or TCI state ID is included in list) associated with this configured grant configuration. In the example, nrofHARQ-Processes is 2 and a number of SSB/CSI-RSs associated with configured grants is 2.

Figure 5:
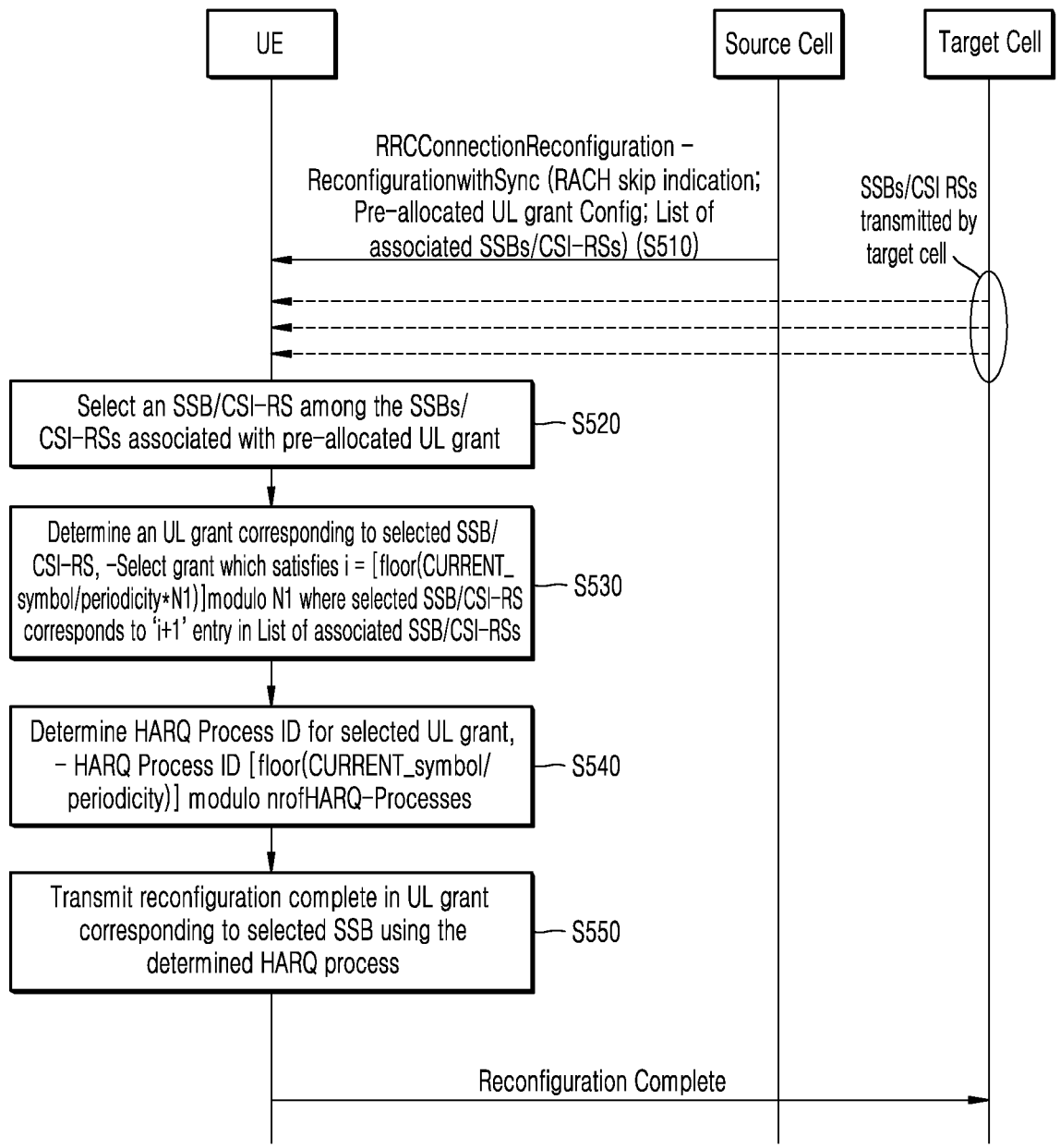
FIG. 5 is a flowchart illustrating a method of mapping SSB/CSI-RSs, HARQ Process IDs and configured UL grants, according to an embodiment of the disclosure.

FIG. 5 is a flowchart illustrating a method of mapping SSBs/CSI-RSs, HARQ Process IDs and configured UL grants, according to an embodiment of the disclosure.

In operation S510, a UE may receive a RRCReconfiguration message from a gNB. spCellConfig in RRCReconfiguration message may include reconfigurationWithSync. Information (e.g. indication to skip RACH) included in reconfigurationWithSync IE indicates that the UE shall skip RACH towards the target cell. The RRCReconfiguration message may include pre-allocated UL grant configuration (parameters indicating periodically occurring UL grants). This configuration may be provided for at least UL BWP indicated by firstActiveUplinkBWP-Id. The RRCReconfiguration message also may include a list (associationList) of SSB/CSI-RS(s) associated with the pre-allocated or configured UL grants. In an alternate embodiment, the above information for pre-allocated/configured UL grant configurations transmitted in RRCReconfiguration message can be transmitted by gNB in connection release message or in system information message for using the configured UL grants in idle/inactive state. pre-allocated/configured UL grant configurations in idle/inactive state are for initial active UL BWP or UL BWP may also be indicated.

In operation S520, the UE may select an SSB/CSI-RS amongst the SSB(s)/CSI RS(s) associated with pre-allocated or configured UL grant(s). Before the selection of the SSB/CSI-RS, SSBs/CSI RSs transmitted by cell (e.g. target cell in case of handover) may be received at the UE.

In operation S530, the UE may determine a configured UL grant corresponding to the selected SSB/CSI-RS. A configured UL grant may be associated with SSB/CSI-RS in 'index+1' row in the list of associated SSB/CSI RSs if index=[floor(CURRENT_symbol/(periodicity*N1))] modulo N1, where where CURRENT_symbol=(SFN×numberOfSlotsPerFrame×numberOfSymbolsPerSlot+slot number in the frame×numberOfSymbolsPerSlot+symbol number in the slot)

numberOfSlotsPerFrame and numberOfSymbolsPerSlot refer to the number of consecutive slots per frame and the number of consecutive symbols per slot respectively. numberOfSlotsPerFrame is specific to SCS and is pre-defined for each SCS.

periodicity (in symbols) is the periodicity at which UL grants are configured and is signaled in RRCReconfiguration message or system information or connection release message SFN is the system frame number in which configured UL grant is allocated slot number is the starting slot of configured UL grant symbol number is the starting symbol of configured UL grant nrofHARQ-Processes is signaled in RRCReconfiguration message or system information or connection release message N1=Number of SSBs/CSI-RSs associated with configured UL Grants In operation S540, the UE may determine the HARQ Process ID for selected configured UL grant as follows:

HARQ Process ID=[floor(CURRENT_symbol/(periodicity))] modulo nrofHARQ-Processes where CURRENT_symbol=(SFN×numberOfSlotsPerFrame×numberOfSymbolsPerSlot+slot number in the frame×numberOfSymbolsPerSlot+symbol number in the slot)

numberOfSlotsPerFrame and numberOfSymbolsPerSlot refer to the number of consecutive slots per frame and the number of consecutive symbols per slot respectively. numberOfSlotsPerFrame is specific to SCS and is pre-defined for each SCS.

periodicity (in symbols) is the periodicity at which UL grants are configured and is signaled in RRCReconfiguration message or system information or connection release message SFN is the system frame number in which configured UL grant is allocated slot number is the starting slot of configured UL grant symbol number is the starting symbol of configured UL grant nrofHARQ-Processes is signaled in RRCReconfiguration message or system information or connection release message In operation S550, the UE may transmit reconfiguration complete message or UL MAC PDU in the determined UL grant corresponding to selected SSB/CSI RS using the determined HARQ process.

Figure 6:
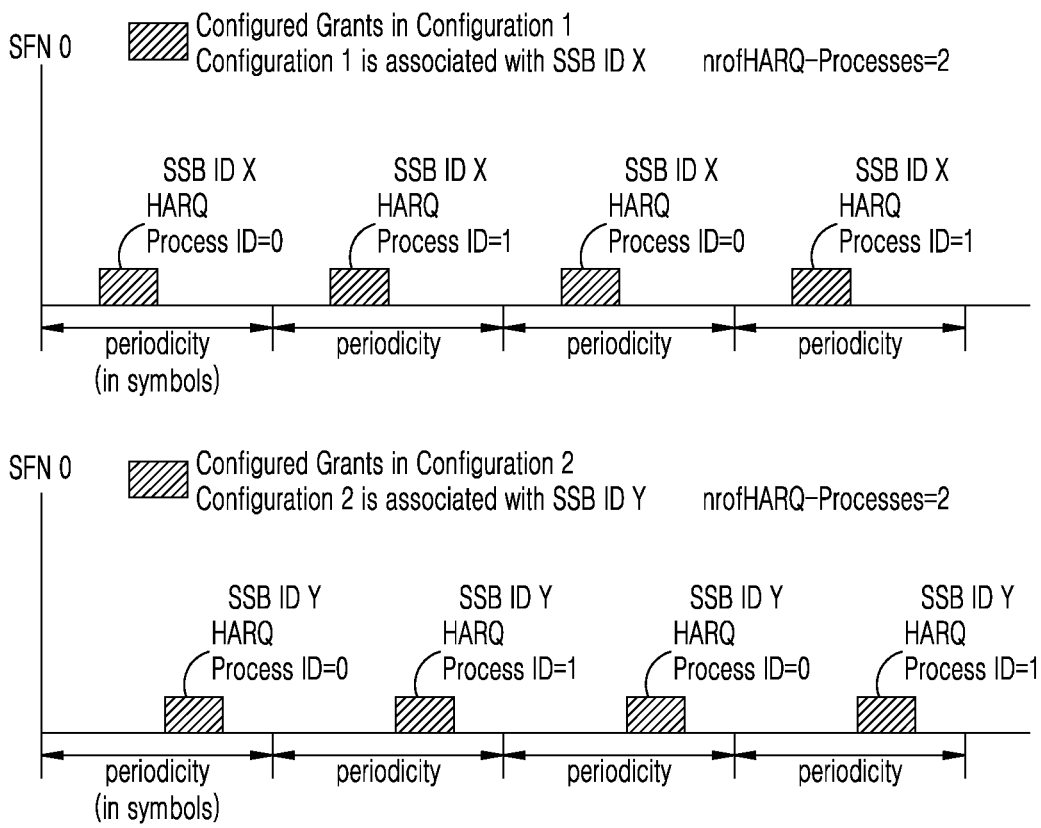
FIG. 6 is a diagram illustrating a method of mapping SSB/CSI-RSs, HARQ Process IDs and configured UL grants, according to an embodiment of the disclosure.

FIG. 6 is a diagram illustrating a method of mapping SSB/CSI-RSs, HARQ Process IDs and configured UL grants, according to an embodiment of the disclosure.

Referring to the FIG. 6, network may signal (e.g. in reconfiguration message or system information message or connection release message) one or more configured grant configurations. Each configured grant configurations may be associated with a SSBs/CSI RS(s) (SSB ID(s) or CSI RS ID(s) or TCI state ID(s) is indicated). In this example, there are two configured grant configuration wherein configuration 1 is associated with SSB ID X and configuration 2 is associated with SSB ID Y. All the UL grants configured via a configuration 1 belongs to SSB X. All the UL grants configured via a configuration 1 belongs to SSB Y. HARQ Process ID corresponding to each UL grants corresponding to a configuration may be determined as in existing system or explained above.

Figure 7:
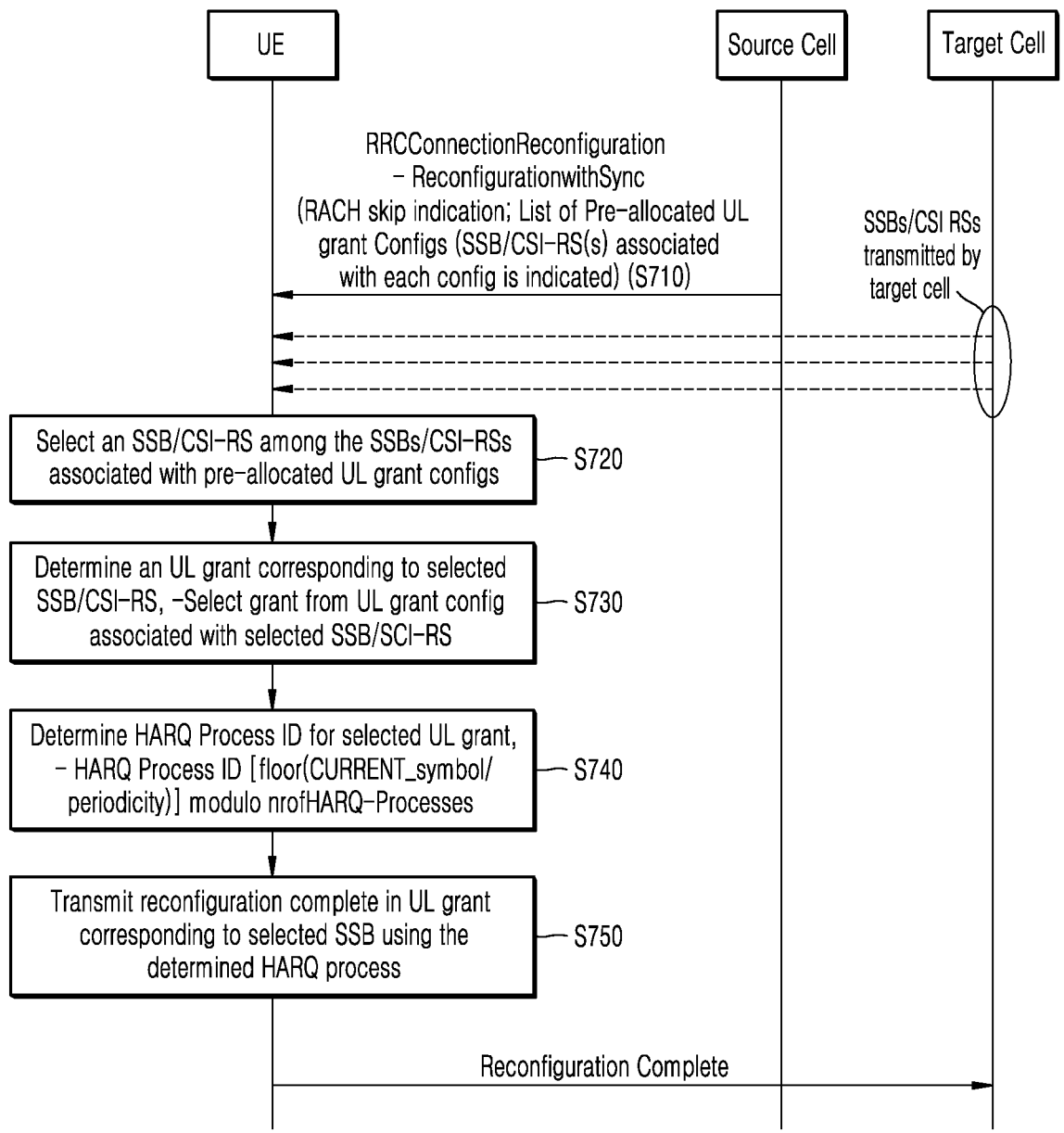
FIG. 7 is a flowchart illustrating a method of mapping SSB/CSI-RSs, HARQ Process IDs and configured UL grants, according to an embodiment of the disclosure.

FIG. 7 is a flowchart illustrating a method of mapping SSB/CSI-RSs, HARQ Process IDs and configured UL grants, according to an embodiment of the disclosure.

In operation S710, a UE may receive a RRCReconfiguration message from a gNB. spCellConfig in RRCReconfiguration message may include reconfigurationWithSync. Information (e.g. indication to skip RACH) included in reconfigurationWithSync IE indicates that the UE shall skip RACH towards the target cell. The RRCReconfiguration message may include one or more pre-allocated/configured UL grant configurations (parameters indicating periodically occurring UL grants). These configurations may be provided for at least the UL BWP indicated by firstActiveUplinkBWP-Id. Each pre-allocated/configured UL grant configurations may be associated with a SSB(s)/CSI RS(s) (SSB ID(s) or CSI RS ID(s) or TCI state ID(s) of SSB(s)/CSI RS(s) is indicated/signaled by gNB). In an alternate embodiment, the above information for pre-allocated/configured UL grant configurations transmitted in RRCReconfiguration message can be transmitted by gNB in connection release message or in system information message for using the configured UL grants in idle/inactive state. pre-allocated/configured UL grant configurations in idle/inactive state are for initial active UL BWP or UL BWP may also be indicated.

In operation S720, the UE may select an SSB/CSI-RS among the SSB(s)/CSI RS(s) associated with pre-allocated or configured UL grant configurations. For example, if there are two configured grant configurations and configuration 1 is associated with SSB X and configuration 2 is associated with SSB Y, UE select an SSB from SSB X and SSB Y. Before the selection of the SSB/CSI-RS, SSBs/CSI RSs transmitted by cell (e.g. target cell in case of handover) may be received at the UE.

In operation S730, the UE may determine a UL grant config associated with selected SSB/CSI-RS. UE may determine the UL grant from selected UL grant config.

In operation S740, UE may determine the HARQ Process ID for the determined configured UL grant from selected configuration as follows:

HARQ Process ID=[floor(CURRENT_symbol/(periodicity))] modulo nrofHARQ-Processes where CURRENT_symbol=(SFN×numberOfSlotsPerFrame×numberOfSymbolsPerSlot+slot number in the frame x numberOfSymbolsPerSlot+symbol number in the slot)

numberOfSlotsPerFrame and numberOfSymbolsPerSlot refer to the number of consecutive slots per frame and the number of consecutive symbols per slot respectively. numberOfSlotsPerFrame is specific to SCS and is pre-defined for each SCS.

periodicity (in symbols) is the periodicity at which UL grants are configured in selected UL grant config SFN is the system frame number in which configured UL grant is allocated slot number is the starting slot of configured UL grant symbol number is the starting symbol of configured UL grant nrofHARQ-Processes is signaled in selected UL grant config In operation S750, the UE may transmit reconfiguration complete message or UL MAC PDU in the determined UL grant corresponding to selected SSB/CSI RS using the determined HARQ process.

Figure 8:
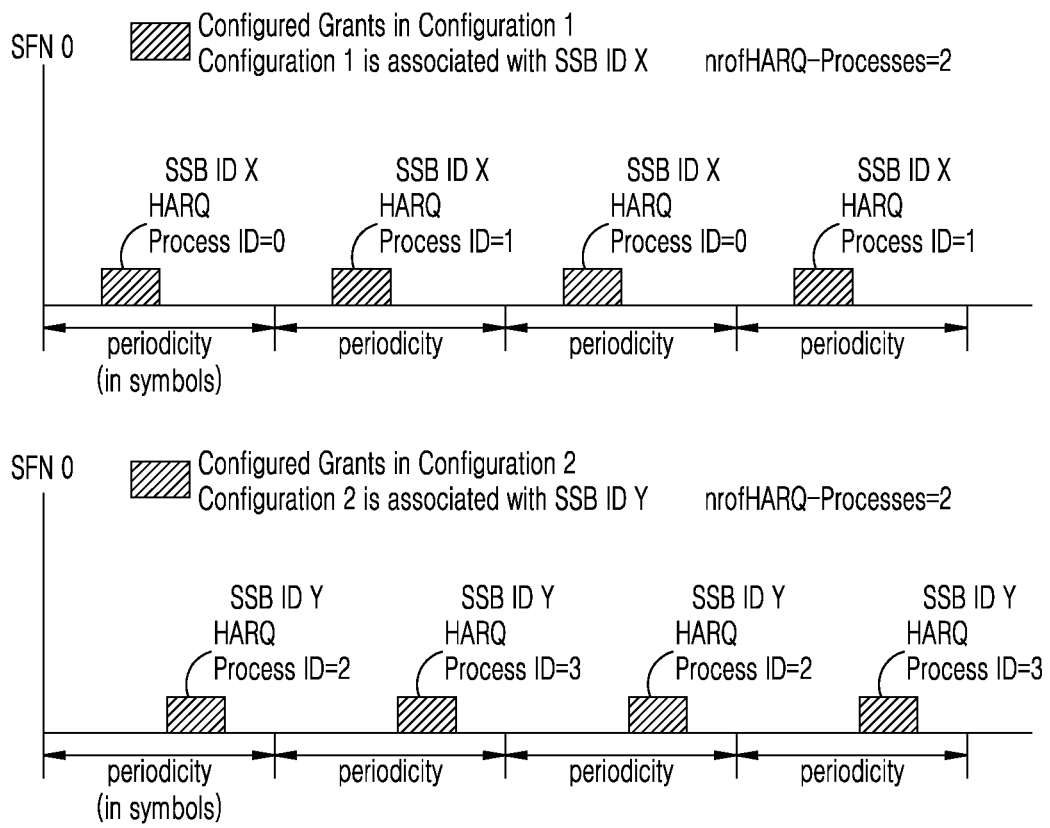
FIG. 8 is a diagram illustrating a method of mapping SSB/CSI-RSs, HARQ Process IDs and configured UL grants, according to an embodiment of the disclosure.

FIG. 8 is a diagram illustrating a method of mapping SSBs/CSI-RSs, HARQ Process IDs and configured UL grants, according to an embodiment of the disclosure.

Referring to the FIG. 8, network may signal (e.g. in reconfiguration message or system information message or connection release message) one or more configured grant configurations. Each configured grant configurations is associated with a SSB/CSI RS(s) (SSB ID(s) or CSI RS ID(s) or TCI state ID(s) is indicated). FIG. 8 is an example illustration of mapping between HARQ Process IDs, SSB/CSI-RSs and configured UL grants. In the example there are two configured grant configuration wherein configuration 1 is associated with SSB ID X and configuration 2 is associated with SSB ID Y. All the UL grants configured via a configuration 1 belongs to SSB X. All the UL grants configured via a configuration 1 belongs to SSB Y. Starting HARQ process ID for configuration 1 is 0. Starting HARQ process ID for configuration 2 is 0+nrofHARQ-Processes for configuration 1. Starting HARQ process ID for ith configuration 0+nrofHARQ-Processes for configuration 1+ . . . +nrofHARQ-Processes for configuration 'i−1'.

Figure 9:
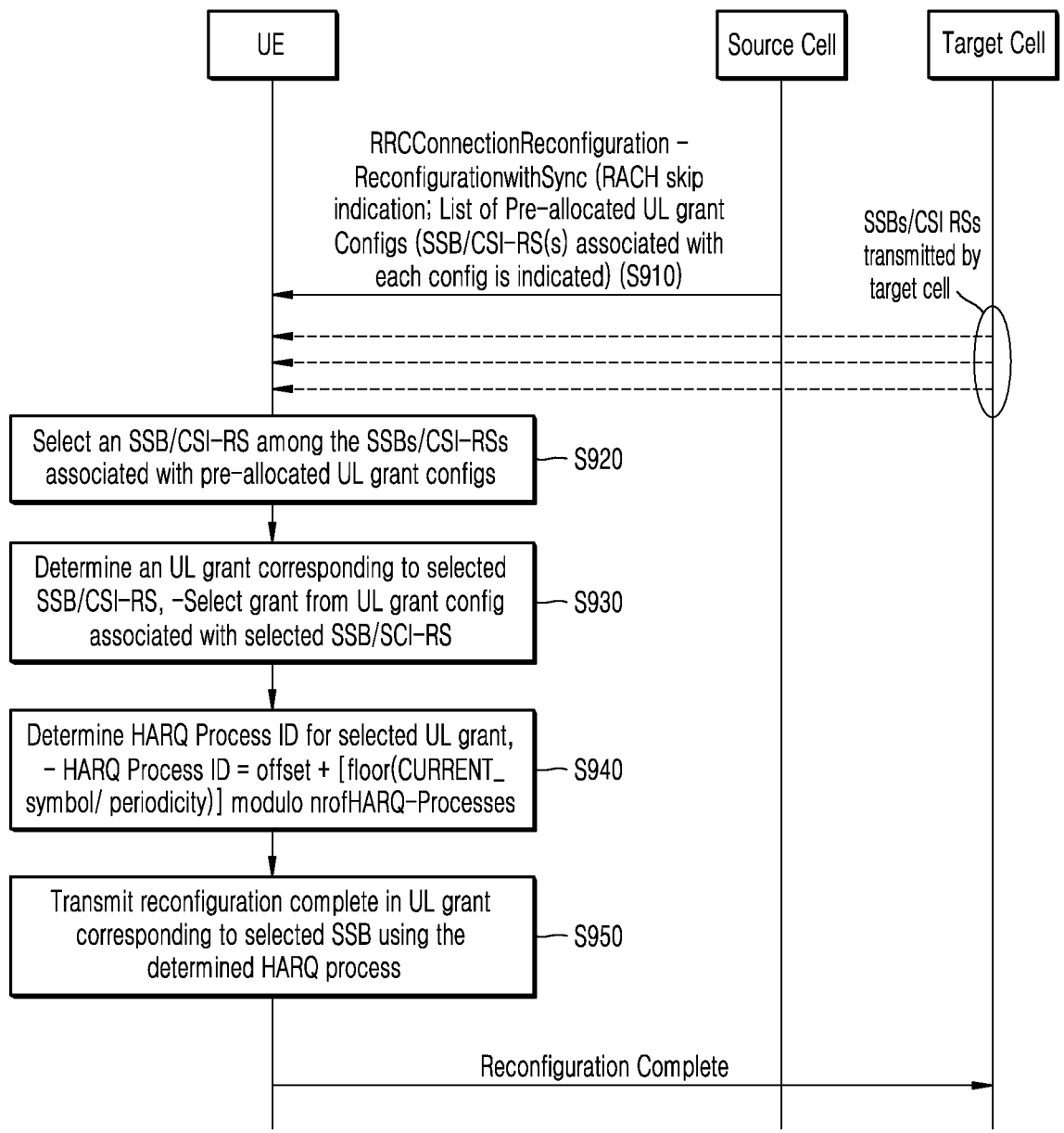
FIG. 9 is a flowchart illustrating a method of mapping SSB/CSI-RSs, HARQ Process IDs and configured UL grants, according to an embodiment of the disclosure.

FIG. 9 is a flowchart illustrating a method of mapping SSBs/CSI-RSs, HARQ Process IDs and configured UL grants, according to an embodiment of the disclosure.

In operation S910, a UE may receive a RRCReconfiguration message from a gNB. spCellConfig in RRCReconfiguration message may include reconfigurationWithSync. Information (e.g. indication to skip RACH) included in reconfigurationWithSync IE indicates that the UE shall skip RACH towards the target cell. The RRCReconfiguration message may include one or more pre-allocated/configured UL grant configurations (parameters indicating periodically occurring UL grants). These configurations are provided for at least the UL BWP indicated by firstActiveUplinkBWP-Id. Each pre-allocated/configured UL grant configurations is associated with a SSB/CSI RS(s) (SSB ID(s) or CSI RS ID(s) or TCI state ID(s) of associated SSB/CSI RS(s) is indicated/signaled by gNB). In an alternate embodiment, the above information for pre-allocated/configured UL grant configurations transmitted in RRCReconfiguration message can be transmitted by gNB in connection release message or in system information message for using the configured UL grants in idle/inactive state. pre-allocated/configured UL grant configurations in idle/inactive state are for initial active UL BWP or UL BWP may also be indicated.

In operation S920, the UE may select an SSB/CSI-RS amongst the SSB(s)/CSI RS(s) associated with pre-allocated or configured UL grant configurations. For example if there are two configured grant configurations and configuration 1 is associated with SSB X and configuration 2 is associated with SSB Y, UE select an SSB from SSB X and SSB Y. Before the selection of the SSB/CSI-RS, SSBs/CSI RSs transmitted by cell (e.g. target cell in case of handover) may be received at the UE.

In operation S930, the UE may determine UL grant config associated with selected SSB/CSI-RS. UE select UL grant from selected UL grant config.

In operation S940, UE may determine the HARQ Process ID for selected configured UL grant from selected configuration as follows:

HARQ Process ID=Offset+[floor(CURRENT_symbol/(periodicity))] modulo nrofHARQ-Processes where CURRENT_symbol=(SFN×numberOfSlotsPerFrame×numberOfSymbolsPerSlot+slot number in the frame×numberOfSymbolsPerSlot+symbol number in the slot)

numberOfSlotsPerFrame and numberOfSymbolsPerSlot refer to the number of consecutive slots per frame and the number of consecutive symbols per slot respectively. numberOfSlotsPerFrame is specific to SCS and is pre-defined for each SCS.

periodicity (in symbols) is the periodicity at which UL grants are configured in selected UL grant config SFN is the system frame number in which configured UL grant is allocated slot number is the starting slot of configured UL grant symbol number is the starting symbol of configured UL grant nrofHARQ-Processes is signaled in selected UL grant config Offset for ith UL grant config is 0+nrofHARQ-Processes for configuration 1++nrofHARQ-Processes for configuration 1+ . . . +nrofHARQ-Processes for configuration 'i−1'

In an alternate embodiment, 'offset' can be signaled in each configured grant configuration. If 'offset' is not signaled for a configured grant configuration, it is assumed as zero.

In operation S950, UE may then transmit reconfiguration complete message or UL MAC PDU in selected UL grant corresponding to selected SSB/CSI RS using the selected HARQ process.

According to another embodiment, the UE may receive a RRCReconfiguration message from a gNB. spCellConfig in RRCReconfiguration message may include a reconfigurationWithSync. Information (e.g. indication to skip RACH) in reconfigurationWithSync IE indicates that UE shall skip RACH towards the target cell. RRCReconfiguration message includes configured UL grant configurations (parameters indicates periodically occurring UL grants). These configurations are provided for at least the UL BWP indicated by firstActiveUplinkBWP-Id. In an alternate embodiment, the above information for pre-allocated/configured UL grant configurations transmitted in RRCReconfiguration message can be transmitted by gNB in connection release message or in system information message for using the configured UL grants in idle/inactive state. pre-allocated/configured UL grant configurations in idle/inactive state are for initial active UL BWP or UL BWP may also be indicated.

The UE may identify whether it may apply the UL grants indicated in configured UL grant configurations before the RACH less reconfiguration with sync is completed or not, as below.

Option 1: configured UL grant configurations for RACH less reconfiguration with sync are separately configured e.g. using a new IE ConfiguredGrantConfigRACHless. If this IE is included in RRCReconfiguration message, UE uses the UL grants indicated in this IE for RACH less reconfiguration with sync.

Option 2: configured UL grant configurations for RACH less reconfiguration with sync are not separately configured. If the grant configuration includes associated SSB/CSI-RSs or if the list of SSB/CSI-RSs associated with grant configuration is signaled, UE use the UL grants indicated in grant configuration for RACH less reconfiguration with sync.

Figure 10:
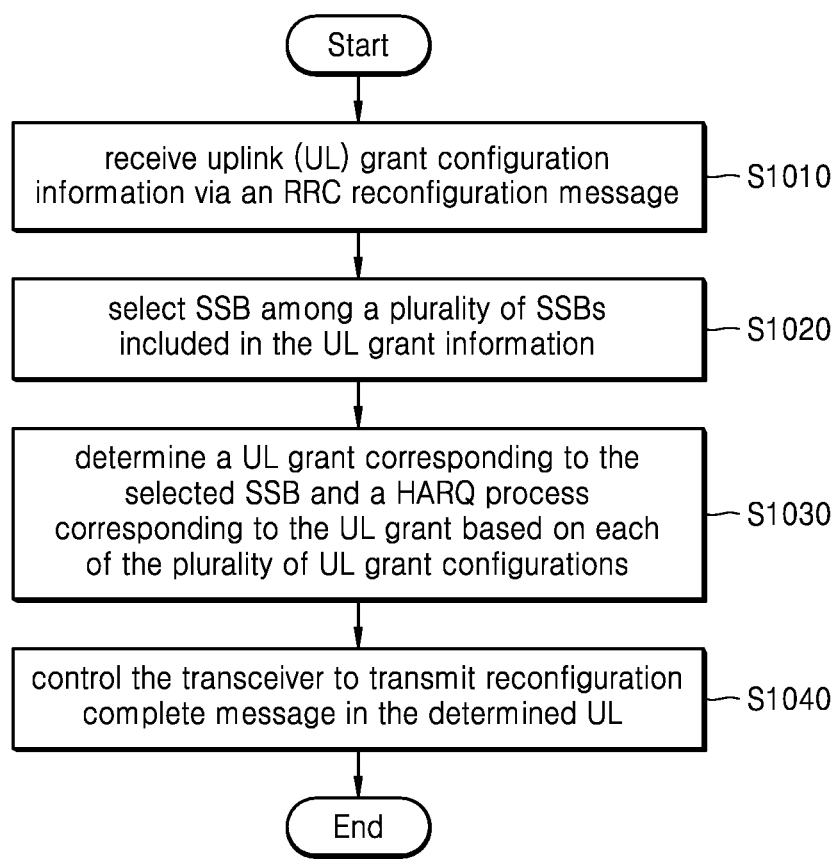
FIG. 10 is a flow chart illustrating a method of mapping SSB/CSI-RSs, HARQ Process IDs and configured UL grants, at the UE, according to embodiments of the disclosure.

FIG. 10 is a flow chart for a method of mapping SSB/CSI-RSs, HARQ Process IDs and configured UL grants, at the UE, according to embodiments of the disclosure.

In operation S1010, the UE may receive uplink (UL) grant configuration information via an RRC reconfiguration message. The UL grant configuration information may include at least one of RACH skip indication, pre-allocated UL grant configuration or a list of associated with the pre-allocated UL grant.

In operation S1020, the UE may select a SSB/CSI-RS among a plurality of SSB/CSI-RSs included in the UL grant information. The UE may obtain a list indicating SSBs/CSI RSs for a plurality of UL grant configurations from the UL grant configuration information. The SSB/CSI-RS is selected according to at least one of the aforementioned embodiments or the combination of the aforementioned embodiments.

In operation S1030, the UE may determine a UL grant corresponding to the selected SSB/CSI-RS and a HARQ process corresponding to the UL grant based on each of the plurality of UL grant configurations. The UL grant is selected according to at least one of the aforementioned embodiments or the combination of the aforementioned embodiments.

In operation S1040, the UE may control the transceiver to transmit reconfiguration complete message or UL MAC PDU in the determined UL grant corresponding to the selected SSB/CSI RS using a HARQ process. The HARQ process is determined according to at least one of the aforementioned embodiments or the combination of the aforementioned embodiments.

Figure 11:
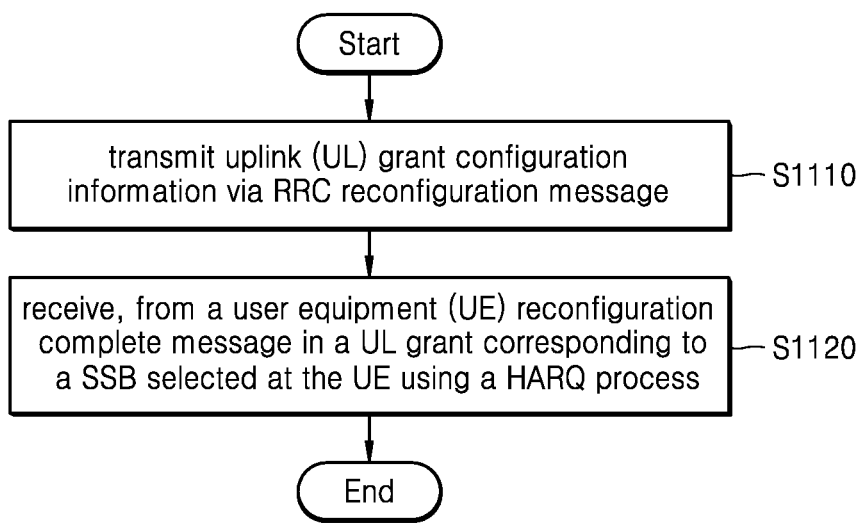
FIG. 11 is a flow chart illustrating a method of mapping SSB/CSI-RSs, HARQ Process IDs and configured UL grants, according to embodiments of the disclosure.

FIG. 11 is a flow chart for a method of mapping SSB/CSI-RSs, HARQ Process IDs and configured UL grants, at a base station, according to embodiments of the disclosure.

In operation S1110, the base station may transmit uplink (UL) grant configuration information via an RRC reconfiguration message. The UL grant configuration information may include at least one of RACH skip indication, pre-allocated UL grant configuration or a list of associated with the pre-allocated UL grant.

In operation S1120, the base station may receive, from the UE, a reconfiguration complete message or UL MAC PDU in a UL grant corresponding to a SSB/CSI RS selected at the UE using a HARQ process. The SSB/CSI RS is selected among a plurality of SSBs/CSI RSs included in the UL grant information, and the UL grant corresponding to the selected SSB/CSI RS and the HARQ process corresponding to the UL grant is determined based on the UL grant information.

Figure 12:
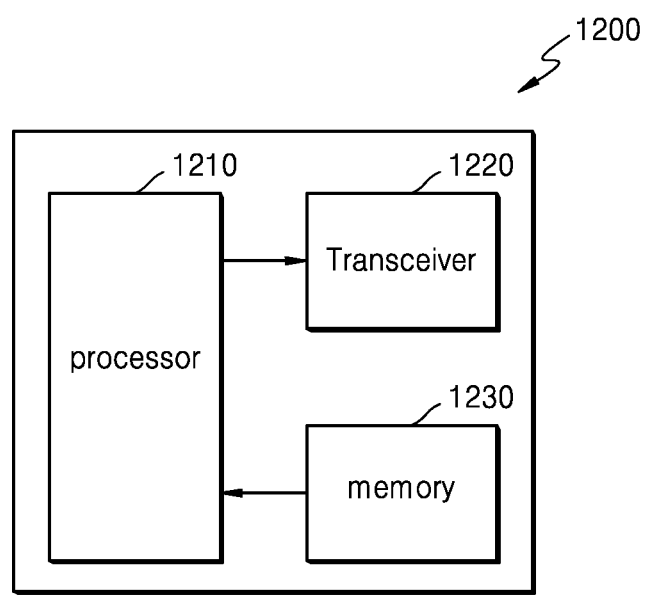
FIG. 12 is a diagram illustrating a UE 1200 according to an embodiment of the present disclosure.

FIG. 12 is a diagram illustrating a UE 1200 according to an embodiment of the present disclosure.

Referring to the FIG. 12, the UE 1200 may include a processor 1210, a transceiver 1220 and a memory 1230. However, all of the illustrated components are not essential. The UE 1200 may be implemented by more or less components than those illustrated in the FIG. 12. In addition, the processor 1210 and the transceiver 1220 and the memory 1230 may be implemented as a single chip according to another embodiment.

The aforementioned components will now be described in detail.

The processor 1210 may include one or more processors or other processing devices that control the proposed function, process, and/or method. Operation of the UE 1200 may be implemented by the processor 1210.

The processor 1210 may control the transceiver 1220 to receive uplink (UL) grant configuration information via RRC reconfiguration message. The processor 1210 may select a SSB/CSI RS among a plurality of SSBs/CSI RSs included in the UL grant information. The processor 1210 may determine a UL grant corresponding to the selected SSB/CSI RS and a HARQ process corresponding to the UL grant based on the UL grant information. The processor 1210 may control the transceiver 1220 to transmit reconfiguration complete message or UL MAC PDU in the determined UL grant corresponding to the selected SSB/CSI RS using a HARQ process.

The transceiver 1220 may be connected to the processor 1210 and transmit and/or receive a signal. The signal may include the RRC reconfiguration message or UL data. In addition, the transceiver 1220 may receive the signal through a wireless channel and output the signal to the processor 1210. The transceiver 1220 may transmit the signal output from the processor 1210 through the wireless channel.

The memory 1230 may store the control information or the data included in a signal obtained by the UE 1200. The memory 1230 may be connected to the processor 1210 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices.

Figure 13:
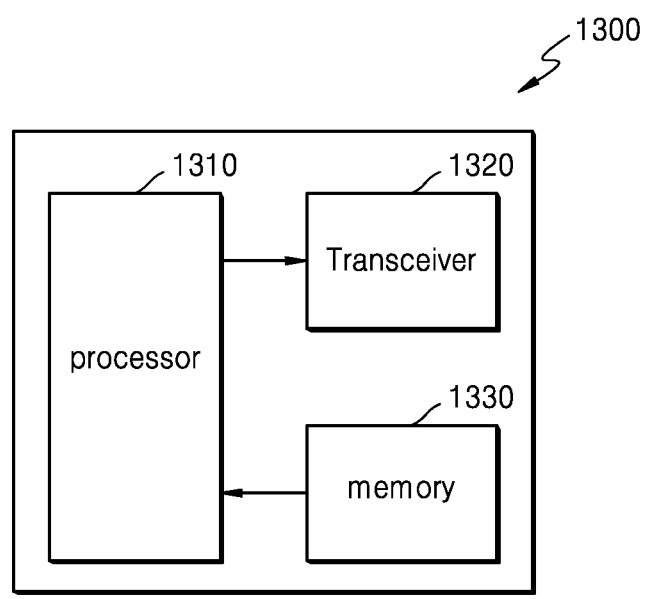
FIG. 13 is a diagram illustrating a base station 1300 according to an embodiment of the present disclosure.

FIG. 13 is a diagram illustrating a base station 1300 according to an embodiment of the present disclosure.

Referring to the FIG. 13, the base station 1300 may include a processor 1310, a transceiver 1320 and a memory 1330. However, all of the illustrated components are not essential. The base station 1300 may be implemented by more or less components than those illustrated in FIG. 13. In addition, the processor 1310 and the transceiver 1320 and the memory 1330 may be implemented as a single chip according to another embodiment.

The aforementioned components will now be described in detail.

The processor 1310 may include one or more processors or other processing devices that control the proposed function, process, and/or method. Operation of the base station 1300 may be implemented by the processor 1310.

The processor 1310 may control the transceiver 1320 to transmit uplink (UL) grant configuration information via RRC reconfiguration message. The processor 1310 may control the transceiver 1320 to receive, from a user equipment (UE) reconfiguration complete message in a UL grant corresponding to a SSB/CSI RS selected at the UE using a HARQ process.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the base station 1300. The memory 1330 may be connected to the processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices. At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The present disclosure is not restricted to the details of the foregoing embodiment(s). The present disclosure extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of performing communication in a wireless communication system by a user equipment (UE), the method comprising:
   receiving uplink (UL) grant configuration information via a radio resource control (RRC) release message;
   selecting a synchronization signal block (SSB) among at least one SSB identified based on the UL grant configuration information;
   identifying a UL grant corresponding to the selected SSB;
   identifying a hybrid automatic repeat request (HARQ) process corresponding to the identified UL grant based on the UL grant configuration information; and
   transmitting a UL medium access control protocol data unit (MAC PDU) based on the identified UL grant using the identified HARQ process in an RRC INACTIVE state.

2. The method of claim 1, wherein identifying the UL grant comprises:
   identifying a periodicity at which one or more UL grants are configured and a number of the at least one SSB associated with the one or more UL grants based on the UL grant configuration information; and
   identifying the UL grant based on a current symbol using the identified periodicity and the identified number of the at least one SSB.

3. The method of claim 1, wherein selecting the SSB comprises:
   obtaining a list indicating the at least one SSB for one or more UL grant configurations from the UL grant configuration information; and
   selecting each SSB for each of the one or more UL grant configurations.

4. The method of claim 3, wherein identifying the HARQ process comprises:
   identifying an offset value for each of the one or more UL grant configurations; and
   identifying the HARQ process corresponding to the UL grant based on the identified offset value.

5. A method of performing communication in wireless communication system by a base station, the method comprising:
   transmitting uplink (UL) grant configuration information via a radio resource control (RRC) release message; and
   receiving, from a user equipment (UE) in an RRC INACTIVE state, a UL medium access control protocol data unit (MAC PDU) based on a UL grant using a hybrid automatic repeat request (HARQ) process,
   wherein:
      a synchronization signal block (SSB) among at least one SSB identified based on the UL grant configuration information is selected at the UE,
      the UL grant corresponding to the selected SSB is identified at the UE, and
      the HARQ process corresponding to the identified UL grant is identified based on the UL grant configuration information.

6. The method of claim 5, wherein:
   a periodicity at which one or more UL grants are configured and a number of the at least one SSB associated with the one or more UL grants are identified based on the UL grant configuration information, and
   the UL grant is identified based on a current symbol using the identified periodicity and the identified number of the at least one SSB.

7. The method of claim 5, wherein the UL grant configuration information includes a list indicating the at least one SSB for one or more UL grant configurations.

8. The method of claim 7, wherein:
   an offset value for each of the one or more UL grant configurations is identified at the UE, and the HARQ process corresponding to the UL grant is identified based on the identified offset value.

9. A user equipment (UE) of performing communication in wireless communication system, the UE comprising:
a transceiver; and
a processor configured to:
receive, via the transceiver, uplink (UL) grant configuration information via a radio resource control (RRC) release message;
select a synchronization signal block (SSB) among at least one SSB identified based on the UL grant configuration information;
identify a UL grant corresponding to the selected SSB;
identify a hybrid automatic repeat request (HARQ) process corresponding to the identified UL grant based on the UL grant configuration information; and
transmit, via the transceiver, a UL medium access control protocol data unit (MAC PDU) based on the identified UL grant using the identified HARQ process in an RRC INACTIVE state.

10. The UE of claim 9, wherein the processor is further configured to:
identify a periodicity at which one or more UL grants are configured and a number of the at least one SSB associated with the one or more UL grants based on the UL grant configuration information; and
identify the UL grant based on a current symbol using the identified periodicity and the identified number of the at least one SSB.

11. The UE of claim 9, wherein the processor is further configured to:
obtain a list indicating the at least one SSB for one or more UL grant configurations from the UL grant configuration information; and
select each SSB for each of the one or more UL grant configurations.

12. The UE of claim 11, wherein the processor is further configured to:
identify an offset value for each of the one or more UL grant configurations; and
identify the HARQ process corresponding to the UL grant based on the identified offset value.

13. A base station of performing communication in wireless communication system, the base station comprising:
a transceiver; and
a processor configured to:
transmit, through the transceiver, uplink (UL) grant configuration information via a radio resource control (RRC) release message; and
receive, via the transceiver, from a user equipment (UE) in an RRC INACTIVE state, a UL medium access control protocol data unit (MAC PDU) based on a UL grant using a hybrid automatic repeat request (HARQ) process,
wherein:
a synchronization signal block (SSB) among at least one SSB identified based on the UL grant configuration information is selected at the UE,
the UL grant corresponding to the selected SSB is identified at the UE, and
the HARQ process corresponding to the identified UL grant is identified based on the UL grant configuration information.

14. The base station of claim 13, wherein:
a periodicity at which one or more UL grants are configured and a number of the at least one SSB associated with the one or more UL grants are identified based on the UL grant configuration information, and
the UL grant is identified based on a current symbol using the identified periodicity and the identified number of the at least one SSB.

15. The base station of claim 13, wherein:
the UL grant configuration information includes a list indicating the at least one SSB for one or more UL grant configurations.

16. The base station of claim 15, wherein:
an offset value for each of the one or more UL grant configurations is identified at the UE, and
the HARQ process corresponding to the UL grant is identified based on the identified offset value.

* * * * *